US008942876B2

(12) United States Patent
Dai et al.

(10) Patent No.: US 8,942,876 B2
(45) Date of Patent: Jan. 27, 2015

(54) METHOD AND SYSTEM FOR CONTROLLING A USER REQUESTED SHIFT IN A HYBRID VEHICLE

(71) Applicant: Ford Global Technologies, LLC, Dearborn, MI (US)

(72) Inventors: Zhengyu Dai, Canton, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 13/765,771

(22) Filed: Feb. 13, 2013

(65) Prior Publication Data

US 2014/0229044 A1 Aug. 14, 2014

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2006.01) |

(52) U.S. Cl.
CPC ............. *B60W 20/30* (2013.01); *Y10S 903/902* (2013.01)
USPC ................................ 701/22; 701/51; 903/902

(58) Field of Classification Search
CPC combination set(s) only.
See application file for complete search history.

(56) References Cited

U.S. PATENT DOCUMENTS

| | | | |
|---|---|---|---|
| 6,006,620 A | 12/1999 | Lawrie et al. | |
| 6,019,698 A | 2/2000 | Lawrie et al. | |
| 7,228,926 B2 * | 6/2007 | Takami et al. | 180/65.265 |
| 7,300,381 B2 * | 11/2007 | Badillo et al. | 477/102 |
| 2006/0254837 A1 | 11/2006 | Andersson et al. | |
| 2012/0150371 A1 | 6/2012 | Swales et al. | |

* cited by examiner

*Primary Examiner* — Rami Khatib
(74) *Attorney, Agent, or Firm* — David B. Kelley; Brooks Kushman P.C.

(57) ABSTRACT

A hybrid vehicle has an engine, an electric machine connected to the engine by an upstream clutch, a transmission gearbox connected to the electric machine by a downstream clutch, and a controller. The controller is configured to, in response to a user commanded shift of the transmission, control the electric machine speed to a designated speed based on gearbox output speed and the transmission gear ratio after the shift, thereby synchronizing speeds across the gearbox for the shift. A method for controlling a hybrid vehicle provides, in response to a user commanded shift of an automatic transmission gearbox, controlling an electric machine speed to a target speed based on the transmission gear ratio after the shift where the target speed is synchronized with the transmission gearbox output speed.

17 Claims, 3 Drawing Sheets

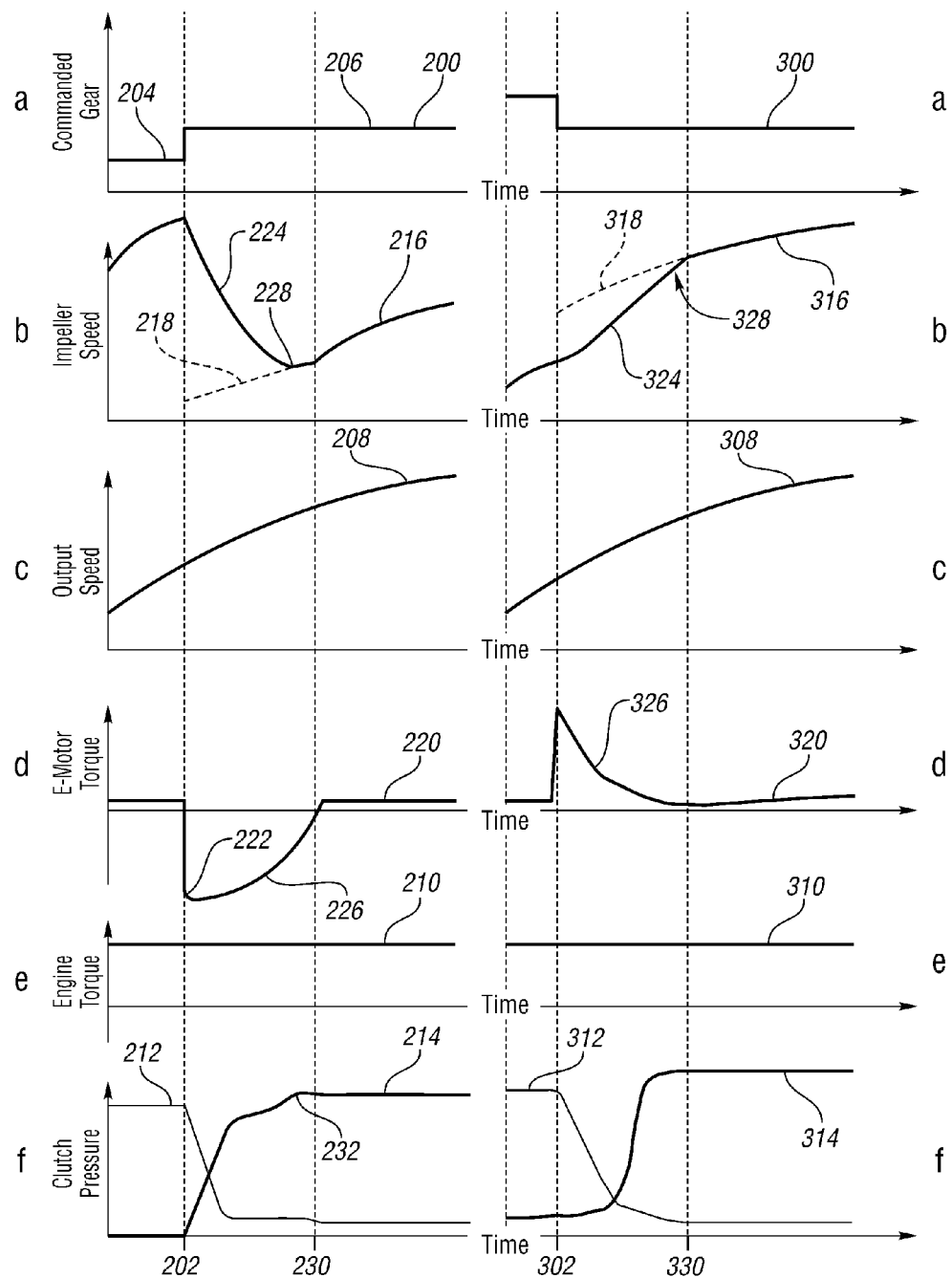

METHOD AND SYSTEM FOR CONTROLLING A USER REQUESTED SHIFT IN A HYBRID VEHICLE

TECHNICAL FIELD

Various embodiments relate to a hybrid vehicle and a method of controlling the hybrid vehicle for a user requested shift of an automatic, step ratio transmission.

BACKGROUND

Some conventional vehicles with automatic, step ratio transmissions are provided with an additional user input for gear selection and shifting, causing the transmission to act as a manumatic. For example, the user may command a gear shift that overrides the automatic drive (D) mode of a transmission having PRNDL as gear selection. The user may provide this input using paddle shifters on the steering wheel, using the automatic transmission console shifter placed into a detent for sequential shifting, or others as are known in the art. The user input typically allows for a user to command a sequential upshift or downshift from the existing gear in the transmission at that time.

When in an automatic mode, such as D, gear shifts for the transmission are controlled using a shift schedule. The transmission controller anticipates the shift and controls the engine speed such that the input speed to the transmission is synchronized with the output speed of the transmission, thereby allowing shifting clutches in the transmission to engage and complete the shift. Providing a high quality, consistent shift based on a user commanded shift may present a challenge as the shift is not anticipated by the automatic shift schedule or the controller. It may also be challenging to meet user expectations of a fast response time to complete shift after the user commands the shift. The time delay may occur due to unsynchronized speeds across the transmission, time to synchronize the speeds across the transmission, engine response time, and accuracy in engine speed control. It may also be challenging to provide a smooth shift to meet vehicle driveability expectations.

SUMMARY

In an embodiment, a hybrid vehicle is provided with an engine, an electric machine connected to the engine by an upstream clutch, a transmission gearbox connected to the electric machine by a downstream clutch, and a controller. The controller is configured to, in response to a user commanded shift of the transmission, control the electric machine speed to a designated speed based on gearbox output speed and the transmission gear ratio after the shift, thereby synchronizing speeds across the gearbox for the shift.

In another embodiment, a method for controlling a hybrid vehicle having an engine selectively coupled to an electric machine by an upstream clutch with the electric machine selectively coupled to an automatic transmission gearbox by a downstream clutch is provided. In response to a user commanded shift of the gearbox, the electric machine speed is controlled to a target speed based on the transmission gear ratio after the shift where the target speed is synchronized with the transmission gearbox output speed.

In yet another embodiment, a computer readable storage device having stored data representing instructions executable by a controller to control a hybrid vehicle is provided. The device has instructions for measuring an output speed of an electric machine, instructions for measuring an output speed of an automatic transmission gearbox having shifting clutches, instructions for measuring a position of a clutch device connecting the electric machine and the gearbox, and instructions for receiving a user commanded shift of the gearbox from a gear ratio to another gear ratio. The device also has instructions for shifting the gearbox, in response to receiving the user commanded shift, using a control sequence by controlling the output speed of the electric machine to a target speed based on the output speed of the gearbox, the another gear ratio and the position of the clutch device, the target speed being synchronized with the output speed of the transmission.

Various embodiments have associated non-limiting advantages. For example, by using the electric machine to meet the shift torque demand after a user commanded shift event, the speeds across the transmission may be quickly synchronized. The electric machine also provides higher precision for speed control. The improved controllability of the electric machine results in a smoother output speed from the transmission, corresponding to a smoother shift and improved drivability for the user. In order to complete the user commanded shift, the electric machine output speed is controlled to a speed that is synchronized with the output speed of the transmission. The electric machine synchronized speed is determined using the output speed of the transmission, the gear ratio of the transmission after the commanded shift is completed, and the status of a launch clutch and/or torque converter connecting the electric machine to the transmission. If the vehicle is in a hybrid mode of operation, the engine is controlled to a generally steady state torque output, thereby meeting driving torque demand for the vehicle. The shifting clutches are controlled within the transmission during the shift event and to complete the shift.

BRIEF DESCRIPTION OF THE DRAWINGS

FIG. 3 is a timing chart for the hybrid vehicle during a user requested upshift according to an embodiment; and FIG. 4 is a timing chart for the hybrid vehicle during a user requested downshift according to an embodiment.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
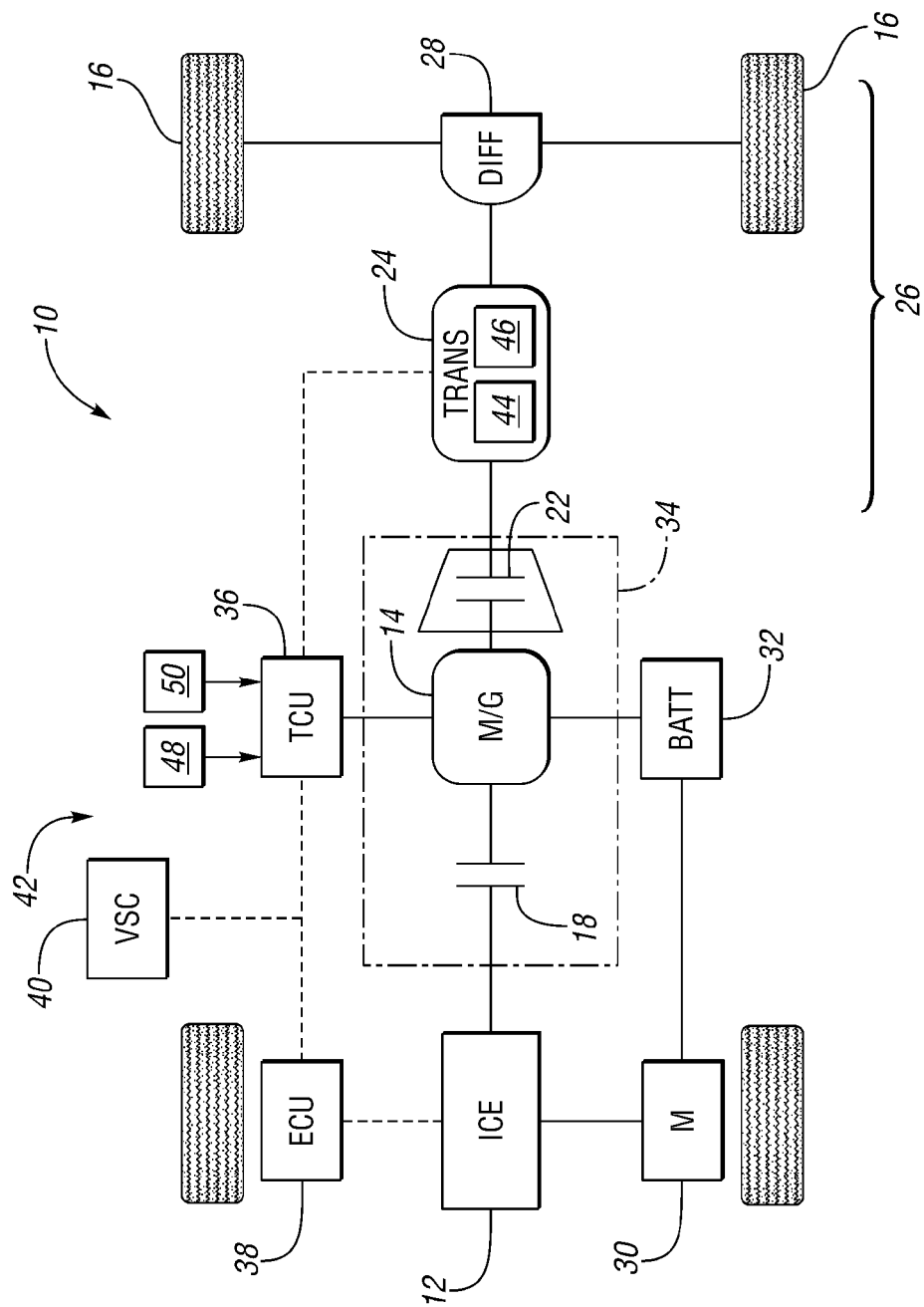
FIG. 1 is a schematic of a hybrid vehicle capable of implementing an embodiment.

FIG. 1 illustrates a schematic diagram of a hybrid vehicle 10 according to an embodiment. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12 or to the vehicle wheels 16.

The M/G 14 is connected to the engine 12 using a first clutch 18, also known as a disconnect clutch or the upstream clutch. The clutch 18 may also include a damper mechanism such as a series of plates and springs configured to help dampen changes in torque transferred between the engine 12 and the M/G 14 when the disconnect clutch 18 is being engaged. A second clutch 22, also known as a launch clutch or the downstream clutch, connects the M/G 14 to a transmission 24, and all of the input torque to the transmission 24 flows through the launch clutch 22. Although the clutches 18, 22 are described and illustrated as hydraulic clutches, other types of clutches, such as electromechanical clutches may also be used. Alternatively, the clutch 22 may be replaced with a torque converter having a bypass clutch, as described further below. In different embodiments, the downstream clutch 22 refers to various coupling devices for the vehicle 10 connecting the M/G 14 to a transmission 24, and includes a traditional clutch, a torque converter, and a torque converter having a bypass (lock-out) clutch.

The engine 12 output shaft, or crankshaft, is connected to the disconnect clutch 18, which in turn is connected to the input shaft for the M/G 14. The M/G 14 output shaft is connected to the launch clutch 22, which in turn is connected to the transmission 24. The various components of the vehicle 10 are positioned sequentially in series with one another. The launch clutch 22 connects the vehicle prime movers to the driveline 26, which includes the transmission 24, differential 28, and vehicle wheels 16, and their interconnecting components. In other embodiments, the method described herein may be applied to a hybrid vehicle having other system architectures as are known in the art.

In an embodiment of the vehicle 10, the downstream clutch 22 is a bypass clutch with a torque converter. The input from the M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical connection between the impeller side and the turbine side for direct torque transfer. The bypass clutch may be slipped and/or opened to control the amount of torque transferred through the torque converter from the M/G 14 to the transmission 24. The torque converter may also include a lockup clutch.

In the vehicle 10, the launch clutch 22 or bypass clutch for the torque converter may be locked to increase fuel efficiency, for example, at higher vehicle speeds. M/G 14 torque and speed may be controlled to a greater accuracy and with a faster response time than engine 12 torque and speed. During an electric-only mode of operation for the vehicle 10, the M/G 14 torque and speed may be controlled during a transmission 24 shift event. During a hybrid mode of operation of the vehicle with both the engine 12 and M/G 14 operating, the M/G 14 torque and speed and engine 12 torque and speed may be controlled together during a transmission 24 shift event.

The engine 12 is a direct injection engine. Alternatively, the engine 12 may be a another type of engine or prime mover, such as a port injection engine or fuel cell, or use various fuel sources, such as diesel, biofuel, natural gas, hydrogen, or the like. In some embodiments, the vehicle 10 also includes a starter motor 30 operatively connected to the engine 12, for example, through a belt or gear drive. The starter motor 30 may be used to provide torque to start the engine 12 without the addition of torque from the M/G 14, such as for a cold start or some high speed starting events.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. The M/G 14 may also be placed in a generator configuration with negative torque output to moderate the amount of engine 12 torque provided to the driveline 26 or to control the speed at the input side of the transmission 24. When the M/G 14 output speed is decreased, an associated negative M/G 14 torque output provides battery 32 charge. In one example the battery 32 is configured to connect to an external electric grid, such as for a plug-in electric hybrid vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter.

The transmission 24 is an automatic, step ratio transmission gearbox and connected to the drive wheels 16 in a conventional manner, and may include a differential 28. The vehicle 10 is also provided with a pair of non-driven wheels, however, in alternative embodiments, a transfer case and a second differential can be utilized in order to positively drive all of the vehicle wheels.

The M/G 14 and the clutches 18, 22 may be located within a motor generator case 34, which may be incorporated into the transmission 24 case, or alternatively, is a separate case within the vehicle 10. The automatic, step ratio transmission 24 has a gear box to provide various gearing ratios for the vehicle 10. The transmission 24 gearbox may include clutches and planetary gearsets, or other arrangements of clutches and gear trains as are known in the art. The transmission 24 may be an automatic six speed transmission, or other speed automatic transmission as is known in the art.

The transmission 24 is controlled using a transmission control unit (TCU) 36, or the like, to operate on a shift schedule, such as a production shift schedule, that connects and disconnects elements, such as shifting clutches within the gear box to control the ratio between the transmission output and transmission input. The transmission 24 is illustrated as having two shifting clutches 44, 46, although any number of shifting clutches is anticipated. For example, shifting clutch 44 is associated with a low gear and shifting clutch 46 is associated with a higher gear in the transmission 24. For an upshift, clutch 44 is disengaged and clutch 46 is engaged. For a downshift, clutch 46 is disengaged and clutch 44 is engaged. The use and control of shifting clutches in an automatic transmission is known in the art. The TCU 36 also acts to control the M/G 14, the clutches 18, 22, and any other components within the motor generator case 34.

An engine control unit (ECU) 38 is configured to control the operation of the engine 12. A vehicle system controller (VSC) 40 transfers data between the TCU 36 and ECU 38 and is also in communication with various vehicle sensors. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator assembly 34, the starter motor 30 and the engine 12 under any of a number of different conditions, including in a way that provides a consistent quality shift in response to a user commanded shift.

Under normal powertrain conditions (no subsystems/components faulted), the VSC 40 interprets the driver's demands, and then determines the wheel torque command based on the driver demand and powertrain limits. The VSC 40 receives a signal from a user shift input, such as an automatic transmission shift lever 48 that provides data to control the transmission 24 and vehicle 10. The shift lever 48 may provide a PRNDL input to the user, or the like. The vehicle 10 also has a user input 50 to provide a user commanded shift or gear change of the automatic transmission 24. This input 50 may be shifting paddles on the steering wheel, or be associated with the transmission shift lever 48 as a sequential gear shifting input. The transmission 24 is therefore a manumatic transmission that typically operates as an automatic, but has the ability for a user to override the TCU 36 and command a gear shift using input 50. When a user commands a gear shift for the transmission 24, the TCU 36 receives an electronic signal from the user input 50 and controls the shifting clutches 44, 46 in the transmission 24, as well as the vehicle prime movers 12, 14, to complete the shift. The VSC 40 may also receive signals from an accelerator pedal and a brake pedal to determine vehicle acceleration or deceleration demands.

The TCU 36 and VSC 40 cooperate to provide control of the gear ratio of the transmission 24 and shifting. Transmission shift control is the process of changing the active torque transmitting gear from one to another. Typically it has two phases, a torque control phase and a speed control phase. The torque control phase switches the torque from the old shifting clutch to the new shifting clutch. The speed control phase aligns the transmission 24 input speed to the output speed across the new gear such that the new shifting clutch may be engaged and locked and the new gear ratio can be achieved. With a torque converter 22, the transmission 24 input speed is linked either hydraulically or mechanically to the speed of the M/G 14 output shaft, which is the output speed of both engine 12 and electrical machine 14 in vehicle 10. The speed of the M/G 14 output shaft is also known as the impeller speed. Therefore during the speed control phase, the engine 12 torque and electrical machine 14 torque may be controlled so the impeller speed quickly approaches the target synchronization speed in order to lock the new shifting clutch. In a user commanded gear shift which may occur at any time, the impeller speed and impeller torque may be greatly different than that need to complete the shift, and there is a quicker shift expectation since it is directly commanded by the user.

For a shift in the transmission 24 to be completed, a first shifting clutch 44, 46 associated with the old gear ratio is slipped and then disconnected, and a second shifting clutch 44, 46 associated with the new, desired gear ratio is slipped and then engaged. For the second shifting clutch to be engaged, the input speed to the transmission 24 needs to at or about a synchronization speed, or target speed. When the input speed of the transmission 24 is at the synchronization speed, the speed at the input and output sides of the second shifting clutch are approximately the same, thereby allowing the clutch to lock. When the speeds across the shifting clutch are not generally the same, it may be difficult to engage the shifting clutch and complete the shift.

The synchronization speed is determined using the output speed of the transmission 24, and the new, desired gear ratio. The speed ratio is the inverse of the gear ratio. The input speed of the transmission 24 times the speed ratio provides the output speed of the transmission 24. When the input speed of the transmission 24 is approximately the synchronization speed, the input speed times the speed ratio at the new, desired gear ratio is approximately the output speed of the transmission 24, and slip across the shifting clutch in the transmission 24 is at or near zero. The synchronization speed for various gear ratios or speed ratios in the transmission 24 may be provided in a calibration or lookup table in the VSC 40 or TCU 36.

During operation in the drive mode (D), the TCU 36 anticipates a shift point based on a shift schedule, and controls the engine 12, or the engine 12 and M/G 14, such that the input speed of the transmission 24 reaches the synchronization speed to provide a well-controlled, smooth shift. The VSC 40 and TCU 36 use the input and output speeds of the transmission 24 and align the speeds before the shift to improve shift quality and provide a smoother shift. When shift quality is low, the shift may be delayed or there may be a disturbance in the driveline that may be apparent to the user.

When a user provides a shift command to override D operation of the transmission 24, the shift command may occur at any point during vehicle operation, including at times other than those included as shift points in the shift schedule. The user may command a shift when the input and output speeds of the transmission are not aligned. The user may command a shift that would not be expected by the automatic shift schedule, such as a power on upshift or downshift, or a power off upshift or downshift. The input speed to the transmission 24 may be vastly different from the synchronization speed for the commanded shift and new gear ratio, and a delay may occur before the shift can be completed due to the time needed to bring the transmission 24 input shaft speed to the synchronization speed.

During a user command gear shift in vehicle 10, electric machine 14 torque is the primary source to control impeller speed while engine 12 torque may provide the drive demand torque. A power on upshift or downshift is a shift commanded with the accelerator pedal pressed with a positive output torque positive to the driveline 26. A power off upshift or downshift is a shift commanded with the accelerator pedal unpressed with a negative output torque to the driveline 26. In these four types of shifts, the M/G 14 is primarily responsible for the shift related torque control and the engine 12 torque balances the drive demand torque. The M/G 14 torque profiles are calibrated for each of the different type of shifts. This improves shift quality and consistency. Whenever the M/G 14 torque is set to a negative, it charges the battery, which in turn improves the fuel economy and emissions. Also, engine torque reduction using spark retard can be greatly reduced.

The VSC 40 determines when and how much torque each power source needs to provide in order to meet the driver's torque demand and to achieve the operating points (torque and speed) of the engine 12 and M/G 14. The VSC 40 may interpret a total vehicle torque which includes any positive or negative engine 12 or M/G 14 torque as well as road load torque.

Although the operation of the clutches 18, 22, 44, 46 described uses the term "pressure", thereby implying a hydraulic clutch, other types of devices, such as electromechanical clutches or torque converters where appropriate may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches 18, 22 described herein are in terms of "pressure", though it is understood that it also includes situations where a non-hydraulic force is applied to the clutch plates in a non-hydraulic clutch.

When one of the clutches 18, 22, 44, 46 is locked or engaged, the rotational speeds of the driveline components on either side of the clutch are equal. Slip is the speed difference from one side of a clutch to the other, such that when one of the clutches is slipping, one side has a different speed than the other side. For example, if the M/G 14 output rotational speed is at 1500 rpm and the launch clutch 22 is slipping 100 rpm, the transmission 24 side of the launch clutch 22 is at 1400 rpm. When the downstream clutch 22 is a bypass clutch for a torque converter, it may be also be considered to be slipping when it is fully open since there is a speed differential across the clutch, even when no torque is being transferred through the bypass clutch.

In some embodiments, the clutch 22 is replaced with a torque converter unit including a torque converter and a lockup clutch or bypass clutch. The torque converter has torque multiplication effects when certain rotational speed differentials exist across the torque converter. During torque multiplication, the output torque of the torque converter is larger than that of the input torque due to torque multiplication across the torque converter. Torque multiplication exists for example, when the vehicle 10 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 22 are equal to one another, and the input and output rotational speeds for the device 22 are equal to one another. A locked clutch eliminates slipping and driveline inefficiency across the torque converter, for example, when the rotational speed ratio across the torque converter is greater than approximately 0.8, and may increase fuel efficiency for the vehicle 10.

Figure 2:
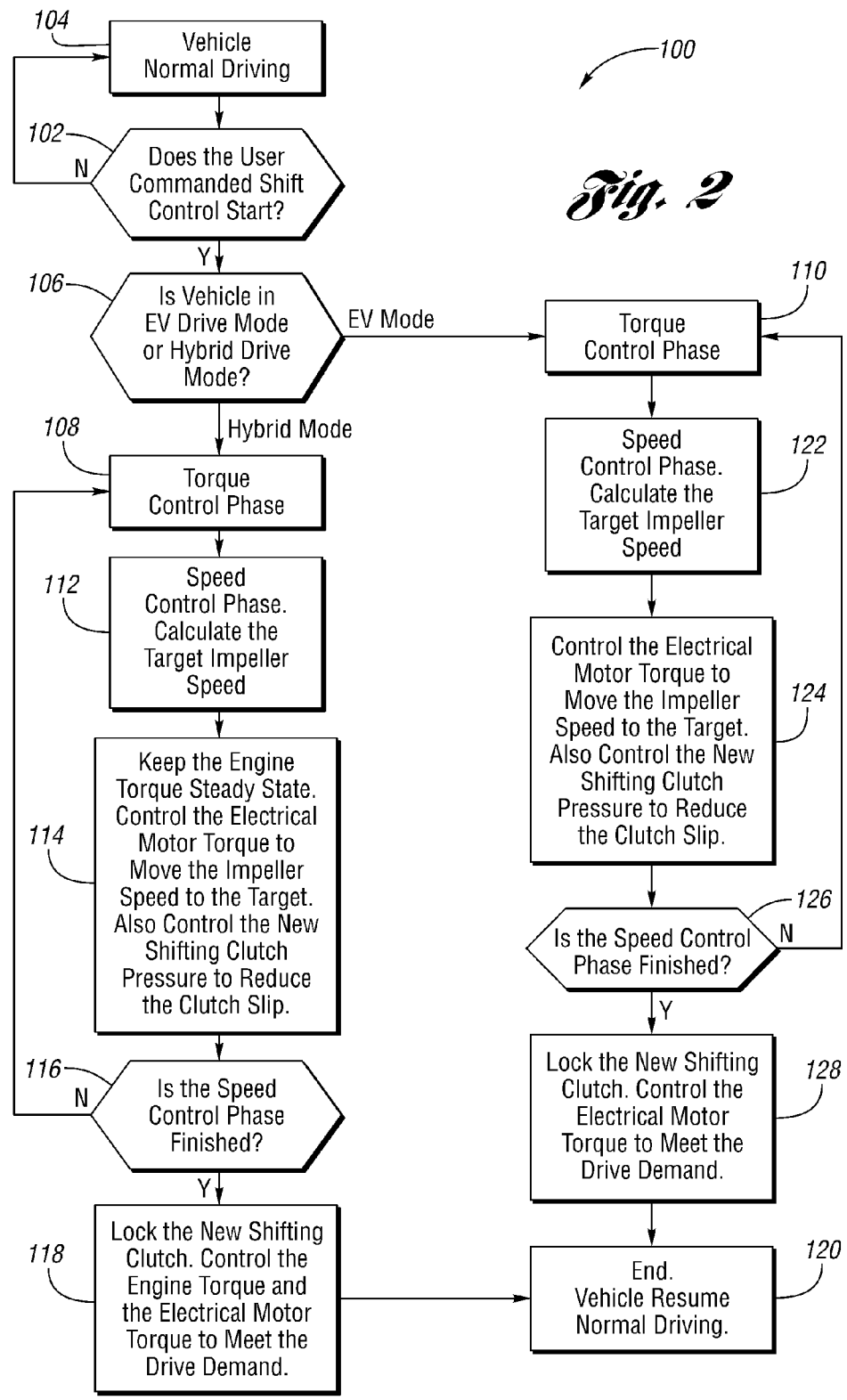
FIG. 2 is a flow chart illustrating a method of controlling a hybrid vehicle according to an embodiment.

FIG. 2 is a flow chart illustrating a method of controlling the vehicle 10 according to an embodiment. The method may be implemented with other hybrid vehicles having an automatic step ratio transmission. Additionally, various steps in the flow chart may be rearranged or omitted, and other steps may be added while remaining within the spirit and scope of the disclosure.

The control system 42 uses algorithm 100 to determine if the vehicle 10 is operating with the transmission 24 in an automatic driving mode, or if the user has commanded a shift at 102 using input 50. If the transmission 24 is in an automatic mode, such as D, the algorithm 100 proceeds to 104 and operates the transmission 24 using the automatic shift schedule. During the automatic shift schedule, the engine 12 may be the primary torque source for the vehicle 10 during a shift, with the M/G 14 as the secondary torque source during a hybrid mode of operation.

If the user has commanded a shift from the transmission 24 using input 50, essentially overriding the automatic control, the algorithm 100 proceeds from 102 to block 106. The control system 42 may determine that the user has commanded a shift by the user inputting a shift request to the user input 50 in the vehicle 10. The control system 42 may also determine that user control has begun and proceed to 106 if the user has activated the user input 50 in the vehicle 10 where a user shift request is anticipated, for example, by moving the transmission lever into a detent associated with plus/minus shifting, or by activating paddle shifters before using them to request a shift.

At 106, the algorithm 100 determines if the vehicle 10 is operating in a hybrid mode of operation or an electric-only mode of operation. For the hybrid mode of operation, the engine 12 and the M/G 14 are operating. The engine 12 is providing torque output to the vehicle 10, and the M/G 14 is acting as a motor to provide torque to the vehicle 10, or as a generator to charge the battery 32. If the vehicle 10 is operating in a hybrid mode, the algorithm 100 proceeds to block 108. If the vehicle 10 is operating in an electric-only mode, the vehicle 10 proceeds to block 110.

At block 108, the control system 42 enters a torque control phase for the transmission 24. The control system 42 commands a change of the shifting clutch in the transmission 24. The control system 42 disengages the shifting clutch 44, 46 associated with the current gear ratio to begin slipping. The control system 42 may also begin to pressurize the shifting clutch 46, 44 in the transmission associated with the desired gear ratio to be able to control the slip.

At 112, the control system 42 enters a speed control phase. The control system 42 receives signals from various vehicle systems and instrumentation. The control system 42 determines the output speed of the transmission 24, the output speed of the M/G 14 or impeller speed, and the status of the downstream clutch device 22, such as the launch clutch, or the torque converter and its associated lockup clutch or bypass clutch. During the shift, the launch clutch 22 position is unchanged. If the lockup clutch or bypass clutch of the torque converter 22 is engaged and locked, it remains so during the shift. If the lockup clutch or bypass clutch of the torque converter 22 is open and torque is flowing through the torque converter, it stays open through the shift event.

The control system 42 calculates a synchronization speed for the M/G 14 output shaft for the commanded shift to be completed. If the launch clutch or the lockup clutch or bypass clutch of the torque converter 22 is engaged and locked, the control system 42 uses the output speed of the transmission 24, and the gear ratio for the requested gear after the shift to determine the synchronization speed. If the lockup clutch or bypass clutch of the torque converter 22 is open such that torque is passing through the torque converter, the control system 42 uses the output speed of the transmission 24, the gear ratio for the requested gear after the shift, and the status of the torque converter, i.e. the slip across the torque converter during the shift, to determine the synchronization speed for the M/G 14 output shaft. The slip across the torque converter is determined by comparing the impeller and turbine speeds of the torque converter.

The control system 42 then proceeds to block 114 to command the M/G 14 such that the impeller speed is the synchronization speed as determined at 110. The engine 12 torque output is commanded to a generally constant level, or kept at steady state. This allows the engine 12 to generally provide the torque needed to meet driving demand on the vehicle 10, such as demand torque needed to meet vehicle accelerations and decelerations.

At 114, the M/G 14 speed is controlled such that the impeller speed is the synchronization speed. For a power on upshift or a power off upshift, the M/G 14 torque output is reduced to a negative value, thereby decreasing the M/G 14 output speed and impeller speed. The M/G 14 acts as a generator during this speed reduction and charges the battery 32. For a power on downshift or power off downshift, the M/G 14 torque is increased if necessary, and the speed of the M/G 14 and impeller speed are increased. The M/G 14 acts as a motor during this speed increase. The M/G 14 generally provides the torque needed to meet shifting quality requirements, or the shifting demand. The M/G 14 is used to meet the shifting demand due to the faster response time of the M/G 14 compared to the engine 12, thereby decreasing the time for a shift completion, providing a smoother shift, and increasing shift quality for a user commanded shift of the automatic transmission 24.

The control system 42 also continues to increase pressure to the shifting clutch 46, 44 associated with the commanded gear ratio such that the slip is decreased across the shifting clutch at 114.

The algorithm 100 then determines if the impeller speed is at the synchronization speed at 116, and that the speed control phase is completed. If the speed control phase is not completed, the algorithm 100 returns to 108. If the speed control phase is completed, the algorithm 100 proceeds to block 118.

At 118, the control system 42 commands the shifting clutch 46, 44 associated with the commanded new gear ratio to engage. As the speeds are synchronized, the shifting clutch should quickly engage for a smooth shift. The control system 42 also commands the engine 12 and M/G 14 to meet the drive demand of the vehicle. The torque output levels of the engine 12 and M/G 14 may be adjusted such that their respective contributions towards the total powertrain torque changes. The algorithm then proceeds to block 120 and the algorithm 100 ends. The control system 42 may cause the transmission 24 to resume operation under an automatic shift schedule.

Referring back to block 106, the algorithm 100 proceeds to block 110 if the vehicle is operating in an electric-only mode after a user commanded shift. At block 110, the control system 42 enters a torque control phase for the transmission 24. The control system 42 commands a change of the shifting clutch in the transmission 24. The control system 42 disengages the shifting clutch 44, 46 associated with the current gear ratio to begin slipping this clutch. The control system 42 may also begin to pressurize the shifting clutch 46, 44 in the transmission associated with the commanded new gear ratio to be able to control the slip across this shifting clutch.

At 122, the control system 42 enters a speed control phase. The control system 42 receives signals from various vehicle systems and instrumentation. The control system 42 determines the output speed of the transmission 24, the output speed of the M/G 14 or impeller speed, and the status of the launch clutch or the lockup clutch or bypass clutch of the torque converter 22. During the shift, the launch clutch 22 position is unchanged. If the lockup clutch or bypass clutch of the torque converter 22 is engaged and locked, it remains so during the shift. If the lockup clutch or bypass clutch of the torque converter 22 is open and torque flows through the torque converter, it stays open through the shift event.

The control system 42 calculates a synchronization speed for the M/G 14 output shaft for completion of the commanded shift. If the launch clutch or the lockup clutch or bypass clutch of the torque converter 22 is engaged and locked, the control system 42 uses the output speed of the transmission 24, and the gear ratio for the new commanded gear to determine the synchronization speed. If the lockup clutch or bypass clutch of the torque converter 22 is open such that torque is passing through the torque converter, the control system 42 uses the output speed of the transmission 24, the gear ratio for the commanded gear, and the status of the torque converter, i.e. the slip across the torque converter during the shift, to determine the synchronization speed for the M/G 14 output shaft.

The control system 42 then proceeds to block 124 to command the M/G 14 such that the impeller speed is the synchronization speed as determined at 110. The engine 12 is not operating, as the vehicle is in an electric-only mode. The M/G 14 output shaft speed is controlled to the synchronization speed. For a power on upshift or a power off upshift, the M/G 14 torque output is reduced to a negative value, thereby decreasing the motor output speed and impeller speed. The M/G 14 acts as a generator during this speed reduction and charges the battery 32. For a power on downshift or power off downshift, the M/G 14 torque is increased if necessary, and the speed of the M/G 14 and impeller speed are increased. The M/G 14 acts as a motor during this speed increase. The M/G 14 provides the torque needed to meet driving demand on the vehicle 10, such as demand torque needed to meet vehicle accelerations and decelerations. The M/G 14 also provides the torque needed to meet shifting quality requirements, or the shifting demand. The fast response of the M/G 14 provides for a rapid shift completion and a smoother shift, and increases shift quality for a user commanded shift of the automatic transmission 24.

The control system 42 also continues to increase pressure to the shifting clutch 46, 44 associated with the commanded gear ratio such that the slip is decreased across the shifting clutch at 124.

The algorithm 100 then determines if the M/G 14 output speed is at the synchronization speed at 126 and that the speed control phase is completed. If the speed control phase is not completed, the algorithm 100 returns to 110. If the speed control phase is completed, the algorithm 100 proceeds to block 128.

At 128, the control system 42 commands the shifting clutch 46, 44 associated with the commanded new gear ratio to engage. As the speeds are synchronized, the shifting clutch should quickly engage for a smooth shift. The control system 42 also commands the M/G 14 to meet the drive demand of the vehicle. The algorithm 100 then proceeds to block 120 and ends. The control system 42 may cause the transmission 24 to resume operation under an automatic shift schedule.

FIGS. 3*a-f* illustrate timing charts for a user commanded upshift of the vehicle 10 using algorithm 100. FIG. 3*a* shows the selected gear 200 for the transmission 24 with respect to time. The user commands an upshift for the automatic transmission at time 202, from a lower gear 204 to a higher gear 206, corresponding to block 102 in algorithm 100. This is a power on upshift, as can be seen by the increasing output speed 208 of the transmission 24 in FIG. 3*c*.

As can be seen by FIG. 3*e*, the vehicle 10 is in a hybrid mode of operation, as the engine 12 is operating with an engine torque 210. If the engine 12 was not operating and the vehicle 10 was in an electric only mode, the timing charts would be generally the same with the exception of no engine torque output in FIG. 3*e*.

The torque control phase and transitioning from the current shifting clutch 212 associated with gear 204 to the new shifting clutch 214 associated with gear 206 is shown in FIG. 3*f*, which illustrates clutch pressure. At time 202, the pressure to the clutch 212 is reduced so that the clutch begins to slip, and the pressure to clutch 214 begins to increase to prepare the clutch for engagement, corresponding to block 108 in algorithm 100.

The speed of the output shaft 216 of the M/G 14, or impeller speed, is shown in FIG. 3*b*. Before time 202, the speed 216 is increasing to correspond to output speed 208. The synchronized speed is shown as line 218. Synchronized speed 218 is calculated based on the output speed 208, and the gear ratio 206 as discussed with respect to block 112 in algorithm 100. Assume that the clutch 22 is engaged and locked in this example such that torque multiplication effects of the torque converter do not need to be included in the calculation.

Corresponding to block 114 in algorithm 100, the M/G 14 torque output 220, as shown in FIG. 3*d*, is controlled beginning at time 202 to a negative value at 222 such that the M/G 14 is acting as a generator. This causes the M/G 14 output speed and impeller speed to decrease, as shown by 224 in FIG. 3*b*. Note that the impeller speed 216 at time 202 is very different from the synchronized speed 218 at time 202, and the M/G 14 is therefore controlled during the shift to reach the synchronized speed to provide a fast shift with consistency and quality. The M/G torque 220 is ramped at 226 to cause impeller speed to approach the synchronized speed 218. The impeller speed is approximately the synchronized speed at region 228, just prior to time 230. Note that the engine torque 210 is held at a generally constant output from time 202 to time 230. The shifting clutches 212, 214 have pressure controlled to control the slip of each, respectively. Note that the pressure of new shifting clutch 214 is increased to near engagement relatively early in the time period between time 202 and time 230. The completion of these events signals the completion of the speed control phase in block 116 of algorithm 100.

After the M/G 14 speed 216 has generally reached the synchronized speed 218 at 228, the algorithm 100 proceeds to block 118, and the pressure to the shifting clutch 214 is increased to engage and lock the clutch, as shown by pressure increase 232. The shift event is completed at time 230. The M/G 14 was controlled such that the transmission 24 output speed 208 during the shift event, i.e. time 202 to time 230, remained a smooth line and provided a smooth consistent shift to the user. After time 230, the M/G 14 speed is increased to provide the output speed 208. Note that line 216 after time 230 is also the synchronized speed as the shifting clutch 214 and launch clutch or lockup clutch or bypass clutch of the torque converter 22 are both engaged, making the M/G 14 output shaft speed synchronized with the output speed 208. After time 230, the M/G 14 and the engine 12 are controlled to provide the output speed 208 as shown.

FIGS. 4a-f illustrate timing charts for a user commanded downshift of the vehicle 10 using algorithm 100. FIG. 4a shows the selected gear 300 for the transmission 24 with respect to time. The user commands a downshift for the automatic transmission at time 302, from a higher gear 304 to a lower gear 306, corresponding to block 102 in algorithm 100. This is a power on downshift, as can be seen by the increasing output speed 308 of the transmission 24 in FIG. 4c.

As can be seen by FIG. 4e, the vehicle 10 is in a hybrid mode of operation, as the engine 12 is operating with an engine torque 310. If the engine 12 was not operating and the vehicle 10 was in an electric-only mode, the timing charts would be generally as shown with the exception of no engine torque output in FIG. 4e.

The torque control phase and transitioning from the current shifting clutch 312 associated with gear 304 to the new shifting clutch 314 associated with gear 306 is shown in FIG. 4f, which illustrates clutch pressure. At time 302, the pressure to the clutch 312 is reduced so that the clutch begins to slip, and the pressure to clutch 314 begins to increase to prepare the clutch for engagement, corresponding to block 108 in algorithm 100.

The speed of the output shaft 316 of the M/G 14, or impeller speed, is shown in FIG. 4b. Before time 302, the speed 316 increases, which correlates with output speed 308. The synchronized speed is shown as line 318. Synchronized speed 318 is calculated based on the output speed 308, and the gear ratio 306 as discussed with respect to block 112 in algorithm 100. Assume that the clutch 22 is engaged and locked in this example such that torque multiplication effects of the torque converter do not need to be included in the calculation.

Corresponding to block 114 in algorithm 100, the M/G 14 torque output 320, as shown in FIG. 4d, is controlled beginning at time 302 to a higher positive value at 222. This causes the M/G 14 output speed and impeller to increase, as shown by 324 in FIG. 4b. Note that the impeller speed 316 at time 302 is very different from the synchronized speed 318 at time 302, and the M/G 14 is therefore controlled during the shift to reach the synchronized speed to provide a fast shift with consistency and quality. The M/G torque 320 is ramped at 326 to cause impeller speed 316 to approach the synchronized speed 318. The impeller speed is approximately the synchronized speed at region 328, just prior to time 330. Note that the engine torque 310 is held at a generally constant output from time 302 to time 330. The shifting clutches 312, 314 have their pressures controlled to control the slip of each, respectively. Note that the pressure of new shifting clutch 314 is increased to near engagement later during the time period between time 302 and time 330. The completion of these events signals the completion of the speed control phase in block 116 of algorithm 100.

After the impeller speed 316 has generally reached the synchronized speed 318 at 328, the algorithm 100 proceeds to block 118, and the pressure to the shifting clutch 314 is increased to engage and lock the clutch. The shift event is completed at time 230. The M/G 14 was controlled such that the output speed 308 during the shift event, i.e. time 302 to time 330, remained a smooth line and provided a smooth consistent shift to the user. After time 330, the M/G 14 speed is increased to correspond with the output speed 308. Note that line 316 after time 330 is the synchronized speed as the shifting clutch 314 and launch clutch or lockup clutch or bypass clutch of the torque converter 22 are both engaged, making the M/G 14 speed synchronized with the output speed 308. After time 330, the M/G 14 and the engine 12 are controlled to provide the output speed 308 as shown.

Note that shifting clutches 212, 214 in FIG. 3f are controlled with steeper pressure ramps earlier in the time period between time 202 and time 230 during the shift event compared to clutches 312, 314 in FIG. 4f. This is because for a power on upshift, the synchronized speed generally is lower than the impeller speed at the start of the shift, and steeper pressure ramps on the new shifting clutch help to bring down the impeller speed to the synchronized speed earlier during the shift. On the other hand, for a power on downshift, the synchronized speed generally is higher than the impeller speed at the start of the shift, and shallower or delayed pressure ramps on the new shifting clutch help to bring up the impeller speed to the synchronized speed earlier during the shift.

Various embodiments have associated non-limiting advantages. For example, by using the electric machine to meet the shift torque demand after a user commanded shift event, the speeds across the transmission may be quickly synchronized. The electric machine also provides higher precision for speed control. The improved controllability of the electric machine results in a smoother output speed from the transmission, corresponding to a smoother shift and improved drivability for the user. In order to complete the user commanded shift, the electric machine output speed is controlled to a speed that is synchronized with the output speed of the transmission. The electric machine synchronized speed is determined using the output speed of the transmission, the gear ratio of the transmission after the commanded shift is completed, and the status of a launch clutch and/or torque converter connecting the electric machine to the transmission. If the vehicle is in a hybrid mode of operation, the engine is controlled to a generally steady state torque output, thereby meeting driving torque demand for the vehicle. The shifting clutches are controlled within the transmission during the shift event and to complete the shift.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
   an electric machine connected to an engine by an upstream clutch and to a transmission gearbox by a torque converter with a bypass, downstream clutch; and
   a controller configured to, in response to a user commanded transmission shift control the electric machine to a designated speed based on gearbox output speed, a gearbox gear ratio after the shift, and a torque converter status, thereby synchronizing speeds across the gearbox for the shift.

2. The vehicle of claim 1 wherein the controller is further configured to maintain a position of the downstream clutch during the shift.

3. The vehicle of claim 1 wherein the controller is further configured to control the engine to maintain engine torque output to the gearbox during the shift.

4. The vehicle of claim 1 wherein the transmission gearbox is an automatic, step ratio transmission gearbox.

5. The vehicle of claim 1 wherein the transmission gearbox contains at least two shifting clutches.

6. The vehicle of claim 5 wherein the vehicle further comprises a user shift input in communication with the transmission gearbox and controller, wherein the controller is configured to receive a signal from the user shift input for the user commanded shift.

7. The vehicle of claim 6 wherein the user commanded shift overrides automatic shifting control of the transmission gearbox by the controller.

8. A method for controlling a hybrid vehicle having an engine selectively coupled to an electric machine by an upstream clutch with the electric machine selectively coupled to an automatic transmission gearbox by a downstream clutch, comprising, in response to a user commanded shift of the gearbox, controlling the electric machine speed to a target speed based on the gearbox gear ratio after the shift where the target speed is synchronized with the gearbox output speed; and
switching pressure control from a first shifting clutch in the gearbox for a present gear ratio to a second shifting clutch in the gearbox for a gear ratio after the shift.

9. The method of claim 8 further comprising commanding a shift clutch in the gearbox to decrease slip as the electric machine speed approaches the target speed.

10. The method of claim 8 wherein the downstream clutch is a bypass clutch for a torque converter; and
wherein the target speed is further based on a status of the torque converter.

11. The method of claim 8 further comprising controlling the engine to maintain engine torque output to the gearbox during the shift.

12. The method of claim 8 further comprising controlling the downstream clutch to maintain position of the downstream clutch during the shift.

13. The method of claim 8 wherein the user commanded shift of the gearbox is an upshift; and
wherein controlling the electric machine speed to the target speed includes reducing the electric machine speed.

14. The method of claim 13 wherein reducing the electric machine speed includes decreasing electric machine torque output to a negative value such that the electric machine acts as a generator.

15. The method of claim 8 wherein the user commanded shift of the gearbox is a downshift; and
wherein controlling the electric machine speed to the target synchronized speed includes increasing the electric machine speed.

16. The method of claim 8 further comprising, during the shift, providing torque from the engine to generally meet demand for driving torque, and providing torque from the electric machine to generally meet demand for shifting torque.

17. A method for controlling a vehicle having an electric machine (M/G) connected to an engine and an automatic transmission gearbox by upstream and downstream clutches, respectively, comprising, in response to a user commanded gearbox shift, controlling the M/G to a target speed synchronized with the gearbox output speed based on the gearbox gear ratio after the shift; and
commanding a gearbox shift clutch to decrease slip as the M/G approaches the target speed.

* * * * *